US012775448B2

(12) United States Patent
Zhang

(10) Patent No.: US 12,775,448 B2
(45) Date of Patent: Oct. 27, 2026

(54) INFORMATION DISPLAY METHOD, DEVICE, AND STORAGE MEDIUM

(71) Applicant: Beijing Youzhuju Network Technology Co., Ltd., Beijing (CN)

(72) Inventor: Chong Zhang, Beijing (CN)

( * ) Notice: Subject to any disclaimer, the term of this patent is extended or adjusted under 35 U.S.C. 154(b) by 213 days.

(21) Appl. No.: 18/569,957

(22) PCT Filed: Oct. 8, 2022

(86) PCT No.: PCT/CN2022/123903
§ 371 (c)(1),
(2) Date: Dec. 13, 2023

(87) PCT Pub. No.: WO2023/087963
PCT Pub. Date: May 25, 2023

(65) Prior Publication Data
US 2024/0272876 A1 Aug. 15, 2024

(30) Foreign Application Priority Data
Nov. 22, 2021 (CN) ......................... 202111385787.4

(51) Int. Cl.
*G06F 9/44* (2018.01)
*G06F 3/04842* (2022.01)
*G06F 8/20* (2018.01)
*G06F 9/445* (2018.01)
*G06F 9/45* (2006.01)
*G06F 9/451* (2018.01)
*G06F 9/455* (2018.01)

(52) U.S. Cl.
CPC ............ *G06F 8/20* (2013.01); *G06F 3/04842* (2013.01); *G06F 9/451* (2018.02)

(58) Field of Classification Search
CPC .... G06F 3/0483; G06F 3/04842; G06F 9/451; G06F 8/20
See application file for complete search history.

(56) References Cited

U.S. PATENT DOCUMENTS 10,339,724 B2 * 7/2019 Davidson ........... G06Q 30/0283
11,106,339 B2 * 8/2021 Ruby .................. G06F 3/04842
(Continued)

FOREIGN PATENT DOCUMENTS

CN 102984343 A 3/2013
CN 104142786 A 11/2014
(Continued)

OTHER PUBLICATIONS

Roboflow, What are Anchor Boxes in Object Detection?, 2020, pp. 1-8. https://blog.roboflow.com/what-is-an-anchor-box/ (Year: 2020).*
(Continued)

*Primary Examiner* — Mongbao Nguyen
(74) *Attorney, Agent, or Firm* — Alleman Hall LLP

(57) ABSTRACT

An information display method includes: identifying an anchor object; determining, based on position information of the anchor object on a terminal screen, a display position and a display manner of a bubble message corresponding to the anchor object; and in response to an operation on the anchor object, displaying the bubble message at the display position on the terminal screen in the display manner.

20 Claims, 6 Drawing Sheets

(56) References Cited

U.S. PATENT DOCUMENTS

| | | | | |
|---|---|---|---|---|
| 2018/0181261 | A1 * | 6/2018 | Saurabh | G06F 9/451 |
| 2023/0122450 | A1 * | 4/2023 | Olwal | G10L 17/06 345/8 |

FOREIGN PATENT DOCUMENTS

| | | | | | |
|---|---|---|---|---|---|
| CN | 107577395 | A | | 1/2018 | |
| CN | 107765949 | A | | 3/2018 | |
| CN | 108304119 | A | * | 7/2018 | G06F 3/0484 |
| CN | 108984062 | A | | 12/2018 | |
| CN | 109670422 | A | | 4/2019 | |
| CN | 110069190 | A | * | 7/2019 | G06T 19/006 |
| CN | 111857463 | A | * | 10/2020 | G06F 3/04817 |
| CN | 112286415 | A | | 1/2021 | |
| CN | 112312160 | A | * | 2/2021 | G06V 20/62 |
| CN | 112584211 | A | | 3/2021 | |
| CN | 113110905 | A | | 7/2021 | |
| CN | 113340199 | A | * | 9/2021 | G06F 3/016 |
| CN | 114077372 | A | | 2/2022 | |
| JP | 2013254340 | A | | 12/2013 | |

OTHER PUBLICATIONS

Paul et al. (CN 113340199 A), 2021, pp. 1-267. (Year: 2021).*

Loco et al. (CN110069190 A(, 2019, pp. 1-434. (Year: 2019).*

Andrew Bragdon, Code Bubbles: Rethinking the User Interface Paradigm of Integrated Development Environments, 2019, pp. 1-10. https://ieeexplore.ieee.org/stamp/stamp.jsp?tp=&arnumber=6062113 (Year: 2019).*

English translation, Loco et al. (CN 110069190 A), 2019, pp. 1-157. (Year: 2019).*

English translation, Zhang (CN 111857463 A), 2020, pp. 1-15. (Year: 2020).*

China National Intellectual Property Administration, Office Action and Search Report Issued in Application No. 202111385787.4, Sep. 15, 2023, 6 pages.

ISA China National Intellectual Property Administration, International Search Report and Written Opinion Issued in Application No. PCT/CN2022/123903, Dec. 19, 2022, WIPO, 9 pages.

* cited by examiner

INFORMATION DISPLAY METHOD, DEVICE, AND STORAGE MEDIUM

CROSS-REFERENCE TO RELATED APPLICATIONS

The present disclosure is a national stage application filed under 35 U.S.C. 371 based on International Patent Application No. PCT/CN2022/123903, filed Oct. 8, 2022, which claims the priority to the CN patent application No. 202111385787.4 entitled "INFORMATION DISPLAY METHOD, DEVICE, AND STORAGE MEDIUM" filed on Nov. 22, 2021, the disclosures of which are incorporated herein by reference in their entireties.

FIELD

The present disclosure generally relates to the field of computer technologies, and more specifically, to an information display method, device, and storage medium.

BACKGROUND

The improvement in the performance of the terminal device hardware and the continuous development of artificial intelligence technology are accompanied with more applications (shortened as APPs) running on terminal devices.

Nowadays, according to the relevant technologies, after a user operates a certain application on the terminal device, in response to the current user operation, the application will display a message prompt block on the terminal device for the user to view, and such message prompt block automatically disappears after a while, without distracting attention. This type of message prompt block is called bubble message.

Due to the discrepancy of bubble messages in display position and text length, developers have to develop the bubble messages in terms of display position and display manner separately and adaptively, which affects the overall efficiency in developing applications.

SUMMARY

Embodiments of the present disclosure provide an information display method and device, electronic device, storage medium, computer program product, and a computer program, to solve the problem that the developers need to separately and adaptively develop the display position and the display manner of the bubble message, affecting the overall development efficiency.

In a first aspect, embodiments of the present disclosure provide an information display method, comprising:

- identifying an anchor object;
- determining, based on position information of the anchor object on a terminal screen,
- a display position and a display manner of a bubble message corresponding to the anchor object; and
- in response to an operation on the anchor object, displaying the bubble message at the display position on the terminal screen in the display manner.

In a second aspect, the embodiments of the present disclosure provide an information display device, comprising:

- an identifying model for identifying an anchor object;
- a processing module for determining, based on position information of the anchor object on a terminal screen, a display position and a display manner of a bubble message corresponding to the anchor object; and
- a displaying module for displaying the bubble message at the display position on the terminal screen in the display manner in response to an operation on the anchor object.

In a third aspect, the embodiments of the present disclosure provide an electronic device, comprising: a processor and a memory;

- the memory storing computer execution instructions;
- when executing the computer execution instructions stored on the memory, the processor is caused to implement the information display method of the first aspect and various possible designs of the first aspect.

In a fourth aspect, the embodiments of the present disclosure provide a computer-readable storage medium having computer execution instructions stored therein, where the computer execution instructions are executed by a processor, to cause the processor to implement the information display method of the first aspect and various possible designs of the first aspect.

In a fifth aspect, embodiments of the present disclosure provide a computer program product comprising a computer program, where the information display method of the first aspect and various possible designs of the first aspect when executed by a processor the computer program are implemented when the computer program is executed by a processor.

In a sixth aspect, embodiments of the present disclosure provide a computer program, where the information display method of the first aspect and various possible designs of the first aspect when executed by a processor the computer program are implemented when the computer program is executed by a processor.

The embodiments provide an information display method and device, electronic device, storage medium, computer program product, and a computer program. By identifying the anchor object and determining, based on a position of the anchor object relative to the terminal screen, a display position and a text display manner of a bubble message, the solution according to the embodiments can enable automatic computing of the display position and the text display manner of the bubble message, saving the developers' efforts in separate and adaptive development and thus improving the development efficiency.

BRIEF DESCRIPTION OF THE DRAWINGS

In order to make clear the technical solution according to embodiments of the present disclosure or the prior art technology, brief introduction will be provided below on the drawings necessary for the embodiments or the prior art technology. Obviously, the drawings described below only illustrate some embodiments of the present disclosure, based on which the ordinary skilled in the art could apparently obtain others, without doing creative work.

DETAILED DESCRIPTION OF EMBODIMENTS

In order to make the objective, technical solution, and advantages of the present disclosure more apparent, with reference to the drawings, a clear, complete description will be provided below about the technical solution provided by the embodiments of the present disclosure. Obviously, the embodiments described here are only a part of embodiments of the present disclosure, rather than all of them. Based on the embodiments described here, the ordinary skilled in the art could acquire all of the other embodiments falling into the scope of protection of the present disclosure, without doing creative work.

With the development of terminal technology, various terminal devices have been widely used in daily life. Nowadays, a lot of terminal devices employ the Android system. The Android system provides a message prompt function with bubble messages, i.e., after a user operates a certain application on the terminal device, in response to the current user operation, the application will display a message prompt block on the terminal device for the user to view, and such message prompt block will automatically disappear after a while, without distracting attention. Since the bubble messages are not fixed in relative position and text length, developers typically have to develop separately and adaptively the bubble messages in terms of display position and display manner, which affects the development efficiency.

In order to solve the above-mentioned technical problem, the present disclosure provides the following technical conception of: automatically determining a display position and a text display manner of a bubble message based on a position of an anchor object relative to the terminal screen, saving the developers' efforts in separate, adaptive development and thus improving the development efficiency.

Figure 1:
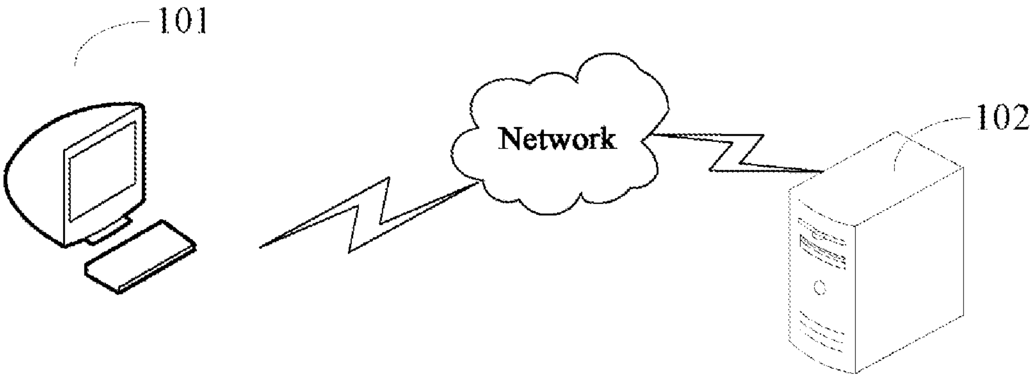
FIG. 1 illustrate a schematic diagram of a scenario of an information display method provided by embodiments of the present disclosure.

FIG. 1 illustrates a schematic diagram of a scenario of an information display method provided by embodiments of the present disclosure. As shown in FIG. 1, in the scenario provided by those embodiments, a terminal device 101 and a server 102 are included. The terminal device 101 may be installed on a device such as a mobile phone, a tablet, a personal computer, and the like. The implementation of the terminal device 101 is not specifically limited in those embodiments, which is feasible as long as the terminal device 101 can fulfil input/output interaction with a user. The server 102 may be a server or a cluster comprised of a plurality of servers.

It is worth noting that the terminal device according to the present disclosure may be a wireless or wired terminal. The wireless terminal may be a device that provides voice and/or other service data connectivity to a user, a handheld device with wireless connectivity, or other processing device connected to a wireless modem. The wireless terminal can communicate with one or more core network devices via a Radio Access Network (RAN), which may be a mobile terminal such as a mobile phone (or also referred to as "cellular" phone) or a computer having a mobile terminal, for example, a portable, pocket-sized, handheld, computer in-built or on-vehicle mobile device that can exchange language and/or data with the RAN. For another example, the wireless terminal may be a device such as a Personal Communication Service (PCS) phone, a cordless phone, a Session Initiation Protocol (SIP) phone, a Session Initiation Protocol (SIP) phone, a Wireless Local Loop (WLL) station, a Personal Digital Assistant (PDA), and the like. The wireless terminal may also be called system, Subscriber Unit, Subscriber Station, Mobile Station, Mobile, Remote Station, Remote Terminal, Access Terminal, User Terminal, User Agent, User Device or User Equipment, which is not limited here. Alternatively, the terminal device may be a device such as a smart watch, a tablet, and the like.

Figure 2:
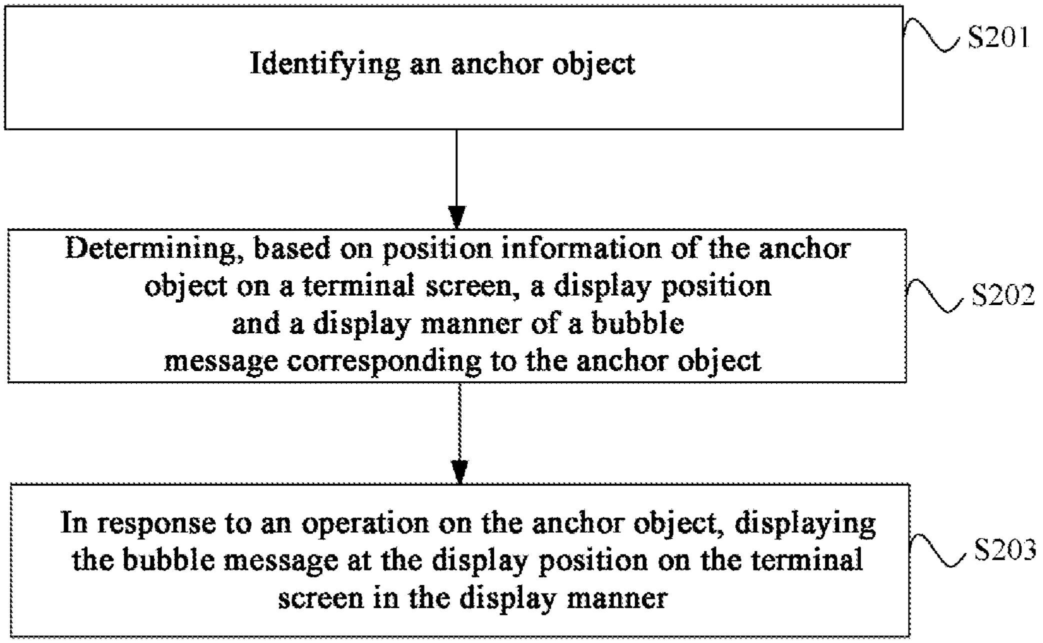
FIG. 2 illustrates a schematic flowchart I of the information display method provided by embodiments of the present disclosure.

FIG. 2 illustrates a schematic flowchart I of the information display method provided by embodiments of the present disclosure. The method according to those embodiments may be applied to the terminal device as shown therein, or may be applied to other electronic devices, which is not limited here. The information display method includes:

S201: identifying an anchor object.

In the embodiments of the present disclosure, the anchor object is a type of hyperlink in an application, through which a link to a specified object, for example, a new file or any other message element, can be attained.

A user can link to other new webpage by clicking on the anchor object, or may open a new message by clicking on the anchor object.

For example, a user clicks on an icon (which is the anchor object) in instant messaging software to open the applet page or game page corresponding to the icon.

S202: based on position information of the anchor object on the terminal screen, determining a display position and a display manner of a bubble message corresponding to the anchor object.

In the embodiments of the present disclosure, a computing model for computing the display position and the display manner of the bubble message can be determined based on a distance of the anchor object on the terminal screen relative to a terminal screen edge, and the display position and the display manner of the bubble message can be determined based on the computing model.

S203: in response to an operation on the anchor object, displaying the bubble message at the displaying position on the terminal screen in the display manner.

In the embodiments of the present disclosure, a user triggers the anchor object by a click on mouse, a touch control or a visual control, and a request is sent to the server based on the trigger of the anchor object so that the server sends a bubble message to the terminal device and displays the bubble message at a corresponding display position on the terminal screen in a corresponding display manner.

From the above description, it can be learned that, by identifying the anchor object and determining, based on a position of the anchor object relative to the terminal screen, a display position and a text display manner of a bubble message, the solution according to the embodiments can enable automatic computing of the display position and the text display manner of the bubble message, saving the developers' efforts in separate and adaptive development and thus improving the development efficiency.

Figure 3:
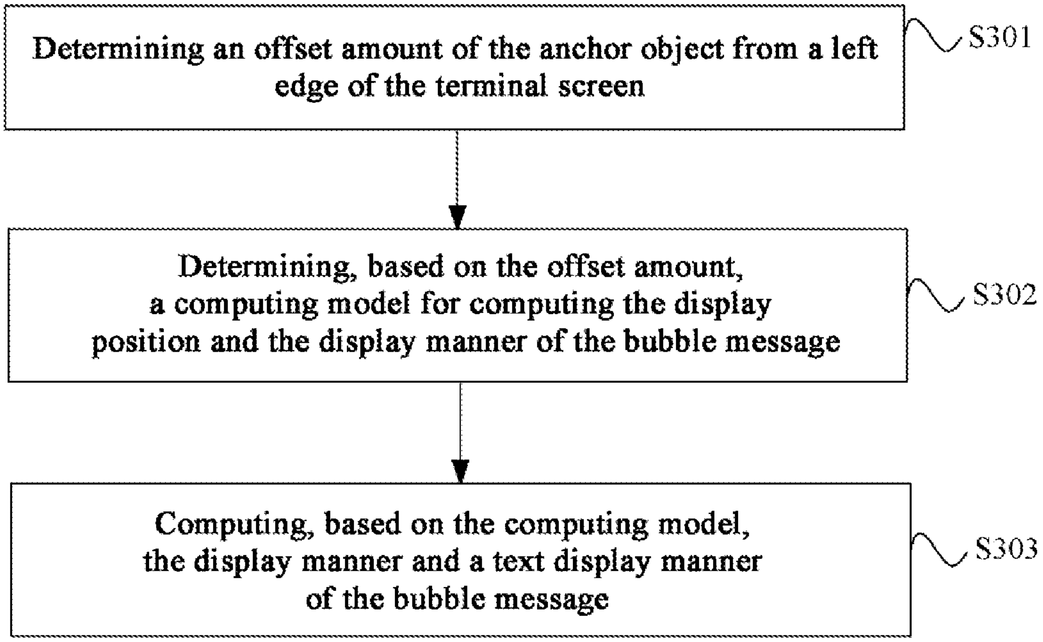
FIG. 3 illustrates a schematic flowchart II of the information display method provided by embodiments of the present disclosure.

FIG. 3 illustrates a schematic flowchart II of the information display method provided by embodiments of the present disclosure. In those embodiments, the detailed description is provided on how to specifically determine a display position and a display manner of a bubble message corresponding to the anchor object, based on position information of the anchor object on the terminal screen, specifically:

S301: determining an offset amount of the anchor object from a left edge of the terminal screen.

S302: based on the offset amount, determining a computing model for computing the display position and the display manner of the bubble message.

S303: based on the computing model, computing the display position and a text display manner of the bubble message.

In a possible implementation of the present disclosure, in step S302, if the offset amount is less than a first preset threshold, it is determined that the computing model for computing the display position and the display manner of the bubble message is a first computing model, where the first computing model performs the following computing:

Based on a distance from the left edge of the anchor object to the left edge of the terminal screen, a minimum offset amount of a message prompt block of a preset bubble message from the left or right side of the terminal screen, a distance from the left edge of the message prompt block of the bubble message to the left edge of the anchor object is computed, specifically with the following equation:

$$xoffset = amchorx - leftorrightoffset$$

where xoffset is the distance from the left edge of the message prompt block of the bubble message to the left edge of the anchor object; anchorx is the distance from the left edge of the anchor object to the left edge of the terminal screen; and leftorrightoffset is the minimum offset amount of the message prompt block of the preset bubble message from the left or right side of the terminal screen.

Based on the distance from the left edge of the message prompt block to the left edge of the anchor object, a width of the anchor object, and a width of an arrow of the message prompt block of the bubble message, a distance from the arrow of the message prompt block of the bubble message to the left edge of the message prompt block of the bubble message is computed, specifically with the following equation:

$$leftMargin = xoffset + \frac{anchorviewwidth}{2} - arrowviewwidth$$

where leftMargin is the distance from the arrow of the message prompt block of the bubble message to the left edge of the message prompt block of the bubble message; anchorviewwidth is the width of the anchor object; arrowviewwidth is the width of the arrow of the message prompt block of the bubble message.

Figure 4:
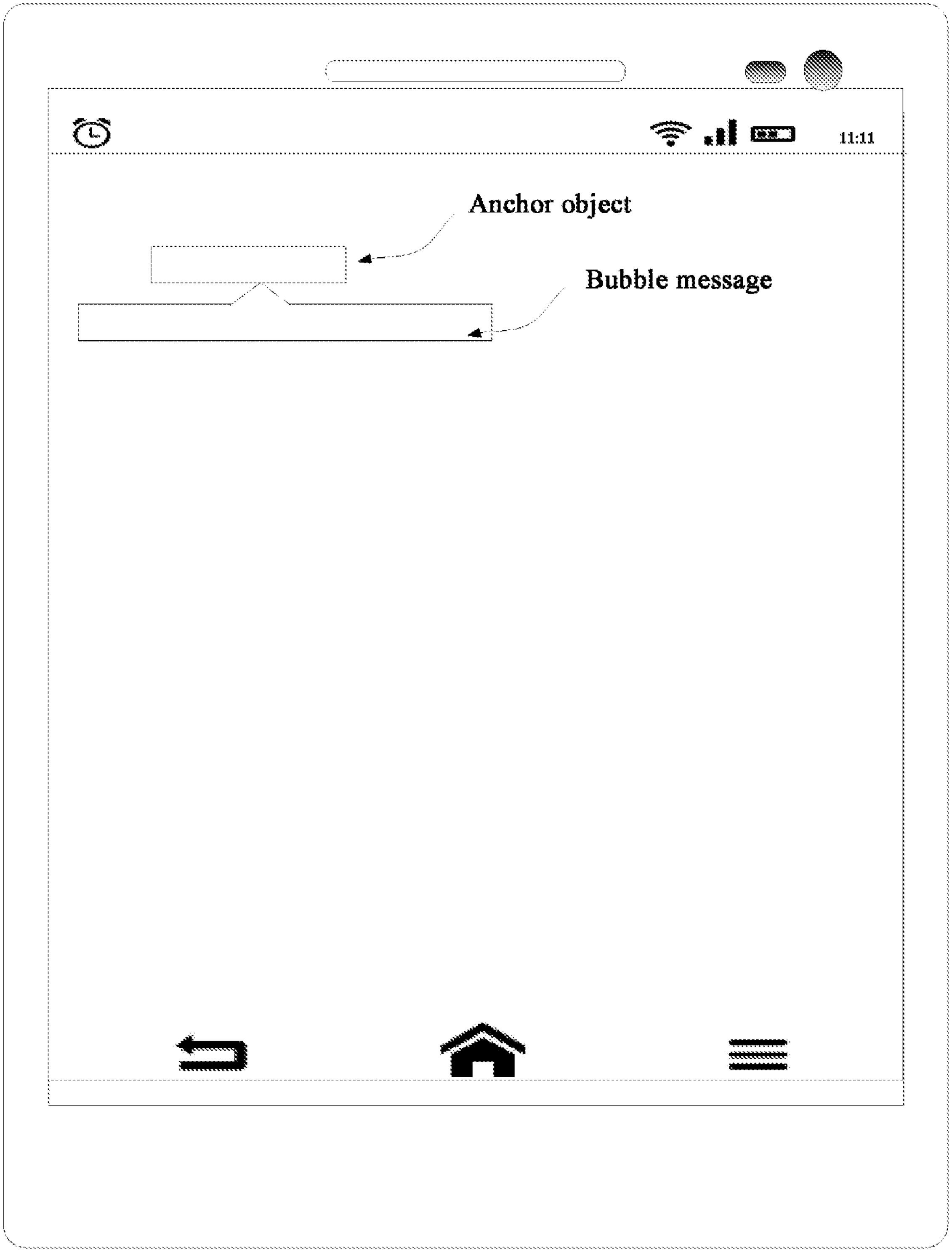
FIG. 4 illustrates a schematic diagram I of display of a bubble message provided by embodiments of the present disclosure.

As shown in FIG. 4, when the first offset amount is less than the first preset threshold, the anchor object is located in the left region of the terminal device.

Correspondingly, in step S303, computing, based on the computing model, the display position and the text display manner of the bubble message includes: based on the distance from the left edge of the message prompt block of the bubble message to the left edge of the anchor object computed by the first computing model, determining the display position of the bubble message; and based on the distance from the arrow of the message prompt block of the bubble message to the left edge of the bubble prompt block of the bubble message computed by the first computing model, determining the text display manner of the bubble message.

The distance from the left edge of the message prompt block of the bubble message to the left edge of the anchor object is determined as a starting position of a left edge of the display position of the bubble message.

Based on the distance from the arrow of the message prompt block of the bubble message to the left edge of the bubble prompt block of the bubble message, the arrow of the message prompt block is displayed, to serve as the text display manner of the bubble message.

As can be seen from the above description, in the case where the anchor object is located in the left region of the terminal screen, the display position and the display manner of the bubble message are automatically computed by the first computing model. The display position and the display manner obtained are more reasonable and provide better user experience in use.

In a further possible implementation of the present disclosure, in step S302, if the offset amount is greater than a second preset threshold, it is determined that the computing model for determining the display position and the display manner of the bubble message is a second computing model, where the second computing model performs the following computing:

Based on a text width of the bubble message, the width of the terminal screen, the distance from the left edge of the anchor object to the left edge of the terminal screen, and the minimum offset amount from the message prompt block of the preset bubble message to the left or right side of the terminal screen, a distance from the left edge of the message prompt block of the bubble message to the left edge of the anchor object is computed, specifically with the following equation:

$$xoffset = textwidth - (screenwidth - anchorx) + leftorrightoffset$$

where xoffset is the distance from the left edge of the message prompt block of the bubble message to the left edge of the anchor object; textwidth is the text width of the bubble message; screenwidth is the width of the terminal screen; anchorx is the distance from the left edge of the anchor object to the left edge of the screen terminal; leftorrightoffset is the minimum offset amount from the message prompt block of the preset bubble message to the left or right side of the terminal screen.

Based on the distance from the left edge of the message prompt block of the bubble message to the left edge of the anchor object, the width of the anchor object, and the width of the arrow of the message prompt block of the bubble message, the distance from the arrow of the message prompt block of the bubble message to the left edge of the message prompt block of the bubble message is computed, specifically with the following equation:

$$leftMargin = xoffset + \frac{anchorviewwidth - arrowviewwidth}{2}$$

where leftMargin is the distance from the arrow of the message prompt block of the bubble message to the left edge of the message prompt block of the bubble message; anchorviewwidth is the width of the anchor object; arrowviewwidth is the width of the arrow of the message prompt block of the bubble message. The second preset threshold is greater than the first preset threshold.

Figure 5:
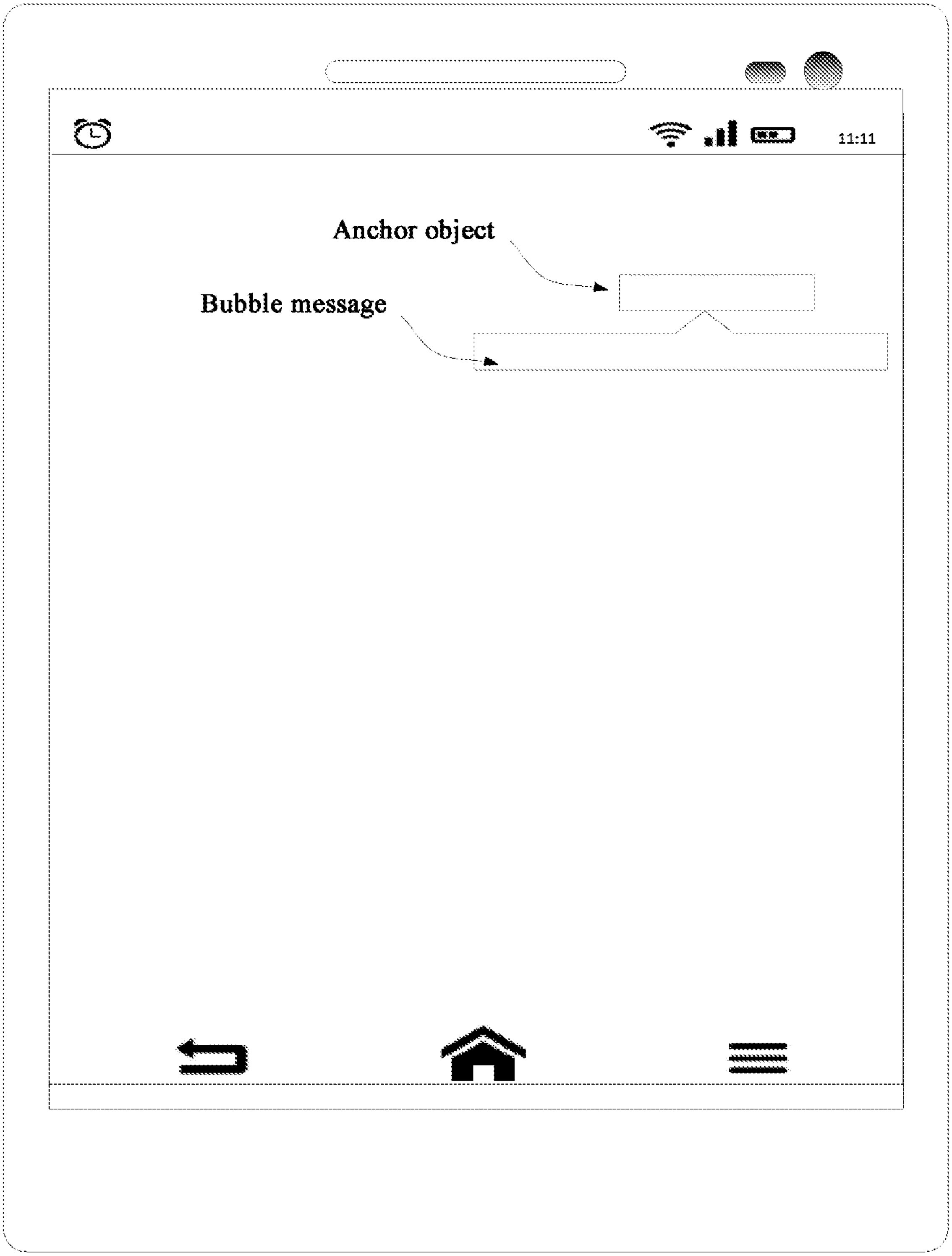
FIG. 5 illustrates a schematic diagram II of display of a bubble message provided by embodiments of the present disclosure.

As shown in FIG. 5, when the offset amount is greater than the second preset threshold, the anchor object is located in the right region of the terminal screen.

Correspondingly, in step S303, computing, based on the computing model, the display position and the text display manner of the bubble message includes:

based on the distance from the left side of the message prompt block of the bubble message to the left edge of the anchor object computed by the second computing model, determining the display position of the bubble message; and based on the distance from the arrow of the message prompt block of the bubble message to the left edge of the message prompt block of the bubble message computed by the second computing model, determining the text display manner of the bubble message.

From the above description, it can be learned that, in the case where the anchor object is located in the right region of the terminal screen, the display position and the display manner of the bubble message are automatically computed by the second computing model. The display position and the display manner obtained are more reasonable and provide better user experience in use.

In a still further possible implementation of the present disclosure, in step S302, if the offset amount is greater than or equal to the first preset threshold, and is less than or equal to the second preset threshold, it is determined that the computing model for computing the display position and the display manner of the bubble message is a third computing model, where the second computing model performs the following computing:

Based on the text width of the bubble message and the width of the anchor object, a distance from the left edge of the message prompt block of the bubble message to the left side of the anchor object is computed, specifically with the following equation:

$$xoffset = \frac{textwidth - anchorviewwidth}{2}$$

where xoffset is the distance from the left edge of the message prompt block of the bubble message to the left edge of the anchor object; textwidth is the text width of the bubble message; anchorviewwidth is the width of the anchor object.

It is computed that the arrow of the message prompt block of the bubble message is located in a center of the text of the bubble message.

Figure 6:
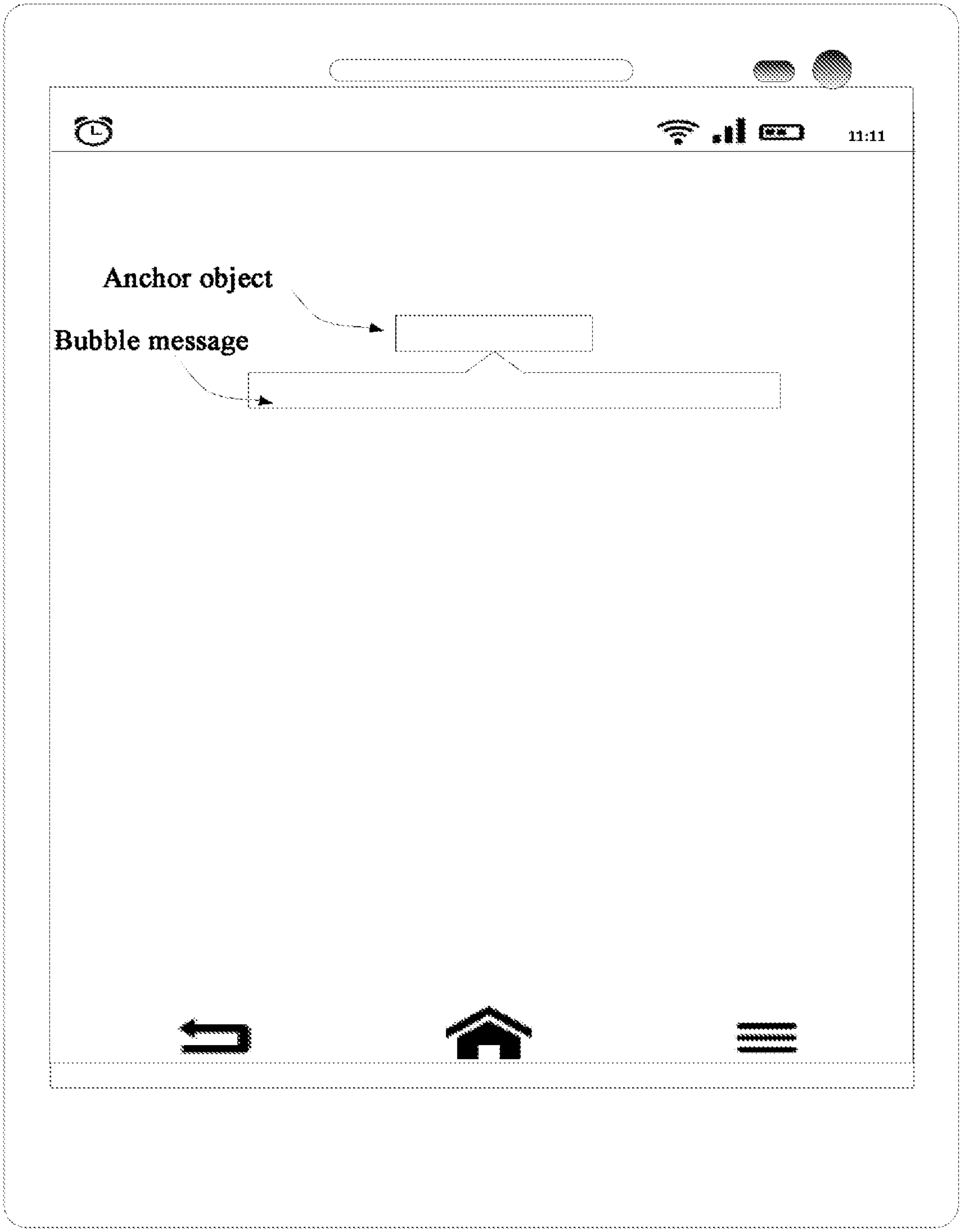
FIG. 6 illustrates a schematic diagram III of display of a bubble message provided by embodiments of the present disclosure.

As shown in FIG. 6, when the offset amount is greater than or equal to the first preset threshold, and less than or equal to the second preset threshold, the anchor object is located in the middle region of the terminal screen.

Correspondingly, in step S303, computing, based on the computing mode, the display manner and the text display manner of the bubble message includes:

Based on the distance from the left edge of the message prompt block of the bubble message to the left edge of the anchor object obtained by the third computing model, determining the display position of the bubble message; and based on that the arrow of the message prompt block of the bubble message is located in the center of the text of the bubble message, determining the text display manner of the bubble message.

From the above description, it can be learned that, in the case where the anchor object is located in the middle region of the terminal screen, the display position and the display manner of the bubble message automatically computed by the third computing model. The display position and the display manner obtained are more reasonable and provide better user experience in use.

Figure 7:
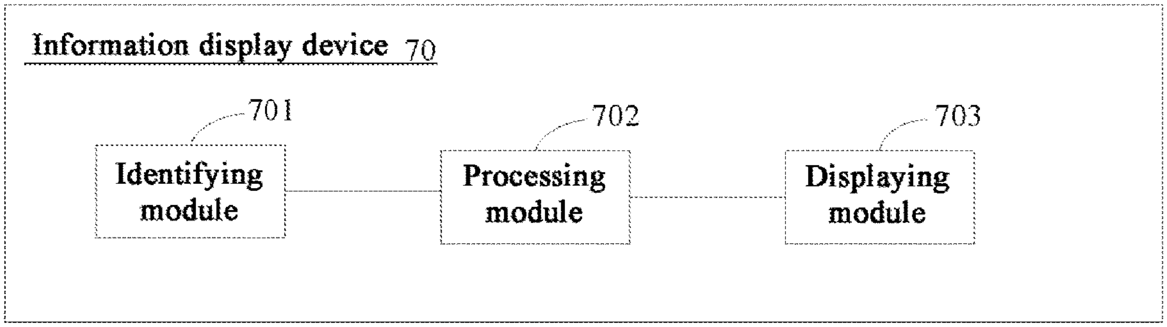
FIG. 7 illustrates a block diagram of a structure of an information display device provided by embodiments of the present disclosure.

Corresponding to the information display method of the embodiments as described above, FIG. 7 illustrates a block diagram of a structure of an information display device provided by embodiments of the present disclosure. For ease of description, only components related to the embodiments of the present disclosure are shown. Referring to FIG. 7, the device includes: an identifying module 701, a processing module 702 and a displaying module 703.

The identifying module 701 is configured to identify an anchor object.

The processing module 702 is configured to determine, based on position information of the anchor object on a terminal screen, a display position and a display manner of a bubble message corresponding to the anchor object.

The displaying module 703 is configured to display the bubble message at the display position on the terminal screen in the display manner in response to an operation on the anchor object.

From the above description, it can be learned that, by identifying the anchor object and determining, based on a position of the anchor object relative to the terminal screen, a display position and a text display manner of a bubble message, the solution according to the embodiments can enable automatic computing of the display position and the text display manner of the bubble message, saving the developers' efforts in separate and adaptive development and thus improving the development efficiency.

Figure 8:
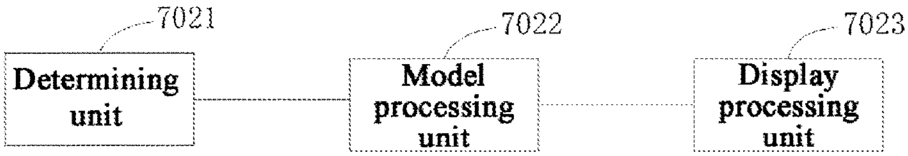
FIG. 8 illustrates a block diagram of a structure of a processing module provided by embodiments of the present disclosure.

FIG. 8 illustrates a block diagram of a structure of a processing module provided by embodiments of the present disclosure. In one or more embodiments of the present disclosure, the processing module 702 includes: a determining unit 7021, a model processing unit 7022, and a display processing unit 7023.

The determining unit 7021 is configured to determine an offset amount of the anchor object from a left edge of the terminal screen.

The model processing unit 7022 is configured to determine, based on the offset amount, a computing model for computing the display position and the display manner of the bubble message.

The display processing unit 7023 is configured to compute, based on the computing model, the display manner and a text display manner of the bubble message.

In one or more embodiments of the present disclosure, the model processing unit 7022 is specifically configured to determine that the computing model for computing the display position and the display manner of the bubble message is a first computing model, if the offset amount is less than a first preset threshold.

In one or more embodiments of the present disclosure, the first computing model is configured to perform:

Based on a distance from the left edge of the anchor object to the left edge of the terminal screen, a minimum offset amount of a preset message prompt block of the bubble message from the left or right side of the terminal screen, a distance from the left edge of the message prompt block of the bubble message to the left edge of the anchor object is computed, specifically with the following equation:

$$xoffset = anchorx - leftorrightxoffset$$

where xoffset is the distance from the left edge of the message prompt block of the bubble message to the left edge of the anchor object; anchorx is the distance from the left edge of the anchor object to the left edge of the terminal screen; and leftorrightoffset is the minimum offset amount of the message prompt block of the preset bubble message from the left or right side of the terminal screen.

Based on the distance from the left edge of the message prompt block to the left edge of the anchor object, a width of the anchor object, and a width of an arrow of the message prompt block of the bubble message, a distance from the arrow of the message prompt block of the bubble message to the left edge of the message prompt block of the bubble message is computed, specifically with the following equation:

$$leftMargin = xoffset + \frac{anchorviewwidth}{2} - arrowviewwidth$$

where leftMargin is the distance from the arrow of the message prompt block of the bubble message to the left edge of the message prompt block of the bubble message; anchorviewwidth is the width of the anchor object; arrowviewwidth is the width of the arrow of the message prompt block of the bubble message.

In one or more embodiments of the present disclosure, the display processing unit 7023 is specifically configured to: based on the distance from the left edge of the message prompt block of the bubble message to the left edge of the anchor object obtained by the first computing model, determine the display position of the bubble message; and based on the distance from the arrow of the message prompt block of the bubble message to the left edge of the message prompt block of the bubble message obtained by the first computing model, determine the text display manner of the bubble message.

In one or more embodiments of the present disclosure, the model processing unit 7022 is specifically configured to determine that the computing model for computing the display position and the display manner of the bubble message is a second computing model, if the offset amount is greater than a second preset threshold.

In one or more embodiments of the present disclosure, the second computing model is configured to perform:

Based on the text width of the bubble message, the width of the terminal screen, the distance from the left edge of the anchor object to the left edge of the terminal screen, and the minimum offset amount from the message prompt block of the preset bubble message to the left or right side of the terminal screen, a distance from the left edge of the message prompt block of the bubble message to the left edge of the anchor object is computed, specifically with the following equation:

$$xoffset = textwidth - (screenwidth - anchorx) + leftorrightoffset$$

where xoffset is the distance from the left edge of the message prompt block of the bubble message to the left edge of the anchor object; textwidth is the text width of the bubble message; screenwidth is the width of the terminal screen; anchorx is the distance from the left edge of the anchor object to the left edge of the screen terminal; leftorrightoffset is the minimum offset amount from the message prompt block of the preset bubble message to the left or right side of the terminal screen.

Based on the distance from the left edge of the message prompt block of the bubble message to the left edge of the anchor object, the width of the anchor object, and the width of the arrow of the message prompt block of the bubble message, the distance from the arrow of the message prompt block of the bubble message to the left edge of the message prompt block of the bubble message is computed, specifically with the following equation:

$$leftMargin = xoffset + \frac{anchorviewwidth - arrowviewwidth}{2}$$

where leftMargin is the distance from the arrow of the message prompt block of the bubble message to the left edge of the message prompt block of the bubble message; anchorviewwidth is the width of the anchor object; arrowviewwidth is the width of the arrow of the message prompt block of the bubble message.

In one or more embodiments of the present disclosure, the model processing unit 7022 is specifically configured to determine that the computing model for computing the display position and the display manner of the bubble message is a third computing model, if the offset amount is greater than or equal to the first preset threshold, and less than or equal to the second preset threshold.

In one or more embodiments of the present disclosure, the third computing module is configured to perform:

Based on the text width of the bubble message and the width of the anchor object, a distance from the left edge of the message prompt block of the bubble message to the left side of the anchor object is computed, specifically with the following equation:

$$xoffset = \frac{textwidth - anchorviewwidth}{2}$$

where xoffset is the distance from the left edge of the message prompt block of the bubble message to the left edge of the anchor object; textwidth is the text width of the bubble message; anchorviewwidth is the width of the anchor object.

It is computed that the arrow of the message prompt block of the bubble message is located in a center of the text of the bubble message.

The device provided by those embodiments can be used to implement the technical solution of the method embodiments as described above. The principle and the technical effect thereof are similar, details of which are omitted here for brevity.

In order to implement the aforementioned embodiments, the embodiments of the present disclosure further provide an electronic device.

Figure 9:
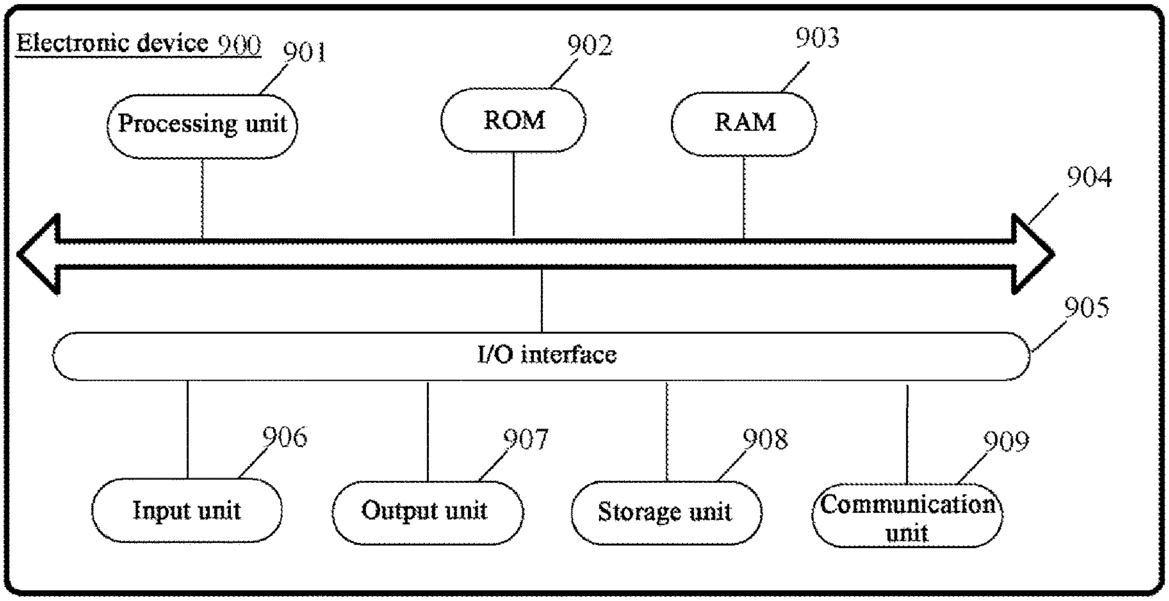
FIG. 9 illustrates a schematic diagram of a hardware structure of an electronic device provided by embodiments of the present disclosure.

FIG. 9 illustrates a schematic diagram of a structure of the electronic device 900 adapted to implement embodiments of the present disclosure, where the electronic device 900 may be a terminal device or a server. The terminal device may include, but is not limited to, a mobile terminal such as a mobile phone, a laptop computer, a digital broadcast receiver, a Personal Digital Assistant (PDA), a Portable Android Device (PAD), a Portable Media Player (PMP), an on-vehicle terminal (e.g. an on-vehicle navigation terminal) or the like, or a fixed terminal such as a digital TV, a desktop computer or the like. The electronic device as shown in FIG. 9 is provided merely as an example, without suggesting any limitation to the functions and the application range of the embodiments of the present disclosure.

As shown therein, the electronic device 900 may include processing unit 901 (e.g. a central processor, a graphics processor and the like), which can execute various acts and processing based on programs stored in a Read Only Memory (ROM) 902 or a program loaded from storage unit 908 to a Random Access Memory (RAM) 903. RAM 903 stores therein various programs and data required for operations of the electronic device 900. The processing unit 901, the ROM 902 and the RAM 903 are connected to one another via a bus 904. An input/output (I/O) interface 905 is also connected to the bus 904.

Typically, the following units may be connected to the I/O interface 905: input unit 906 including, for example, a touchscreen, a touch pad, a keyboard, a mouse, a camera, a microphone, an accelerometer, a gyroscope and the like; output unit 904 including, for example, a Liquid Crystal Display (LCD), a loudspeaker, a vibrator and the like; storage unit 908 including, for example, a tape, a hard drive and the like; and communication unit 909. The communication unit 909 can allow wireless or wired communication of the electronic device 900 with other devices to exchange data. Although FIG. 9 shows the electronic device 900 including various units, it would be appreciated that not all of the units as shown are required to be implemented or provided. Alternatively, more or fewer units may be implemented or provided.

In particular, according to embodiments of the present disclosure, the processes described above with reference to the flowcharts may be implemented as computer software programs. For example, embodiments of the present disclosure include a computer program product comprising a computer program carried on a non-transitory computer readable medium, the computer program containing program code for performing the methods illustrated by the flowcharts. In those embodiments, the computer program may be downloaded and installed from a network via the communication unit 909, or may be installed from the storage unit 908, or may be installed from the ROM 902. The computer program, when executed by the processing unit 901, performs the above-described functions defined in the methods according to the embodiments of the present disclosure.

It should be noted that the computer readable medium according to the present disclosure may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain, or store a program for use by or in connection with an instruction execution system, apparatus, or device. In contrast, in the present disclosure, a computer readable signal medium may include a propagated data signal with computer readable program code embodied therein, either in baseband or as part of a carrier wave. Such propagated data signal may take many forms, including, but not limited to, an electro-magnetic signal, an optical signal, or any suitable combination thereof. A computer readable signal medium may also be any computer readable medium that is not a computer readable storage medium and that can communicate, propagate, or transmit a program for use by or in connection with an instruction execution system, apparatus, or device. Program code embodied on a computer readable medium may be transmitted using any appropriate medium, including but not limited to: electrical wires, optical cables, RF (radio frequency), etc., or any suitable combination of the foregoing.

The computer-readable medium may be the one included in the electronic device, or may be provided separately, rather than assembled in the electronic device.

The computer-readable medium carries one or more programs which, when executed by the electronic device, cause the electronic device to perform the methods according to the embodiments as described above.

Computer program code for carrying out operations according to the present disclosure may be written in any combination of one or more programming languages, including but not limited to an object oriented programming language such as Java, Smalltalk, C++, and conventional procedural programming languages, such as the "C" programming language or similar programming languages. The program code may be executed entirely on the user's computer, partly on the user's computer, as a stand-alone software package, partly on the user's computer and partly on a remote computer or entirely on the remote computer or server. In the case of a remote computer, the remote computer may be connected to the user's computer through any type of network, including a Local Area Network (LAN) or a Wide Area Network (WAN), or the connection may be made to an external computer (for example, through the Internet using an Internet service provider).

The flowchart and block diagrams in the drawings illustrate the functionality and operation of possible implementations of methods, device and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems which perform the specified functions or acts, or combinations of special purpose hardware and computer instructions.

The units described in the embodiments of the present disclosure may be implemented by software or hardware. Wherein, the designation of a module or unit does not in some cases constitute a limitation of the unit itself. For example, the first obtaining unit may also be described as "a unit for obtaining at least two Internet Protocol addresses."

The functions described above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chip (SOCs), Complex Programmable Logic Devices (CPLDs), and the like.

In the context of this disclosure, a machine-readable medium may be a tangible medium that can contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of a computer-readable storage medium would include an electrical connection based on one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

Above described are only relatively optimal embodiments of the present disclosure and the technical principles applied therein. It will be appreciated by those skilled in the art that the scope of the disclosure herein is not limited to the particular combination of features described above, but also encompasses other embodiments in which any combination of the features described above or their equivalents does not depart from the spirit of the disclosure. For example, the above features and (but not limited to) the features disclosed in this disclosure having similar functions are replaced with each other to form the technical solution.

Further, while operations are depicted in a particular order, this should not be understood as requiring that such operations be performed in the particular order shown or in sequential order. Under certain circumstances, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An information display method executed by a hardware processor, the information display method comprising:

executing an instruction configured for identifying an anchor object;

executing an instruction configured for determining, based on position information of the anchor object on a terminal screen, a display position and a display manner of a bubble message corresponding to the anchor object; and in response to an operation on the anchor object, displaying the bubble message at the display position on the terminal screen in the display manner, wherein determining, based on the position information of the anchor object on the terminal screen, the display position and the display manner of the bubble message corresponding to the anchor object comprises:

based on a width of an arrow of a message prompt block of the bubble message, determining the display position of the bubble message; and based on a distance from the arrow of the message prompt block of the bubble message to a left edge of the message prompt block of the bubble message, determining a text display manner of the bubble message.

2. The method of claim 1, wherein executing the instruction configured for determining, based on the position information of the anchor object on the terminal screen, the display position and the display manner of the bubble message corresponding to the anchor object further comprises:

executing an instruction configured for determining an offset amount of the anchor object from a left edge of the terminal screen;

executing an instruction configured for determining, based on the offset amount, a computing model for computing the display position and the display manner of the bubble message; and executing an instruction configured for computing, based on the computing model, the display manner and the text display manner of the bubble message.

3. The method of claim 2, wherein determining, based on the offset amount, the computing model for computing the display position and the display manner of the bubble message comprises:

in response to the offset amount being less than a first preset threshold, determining the computing model for computing the display position and the display manner of the bubble message as a first computing model.

4. The method of claim 3, wherein performing, based on the first computing model, the following computing:

based on a distance from a left edge of the anchor object to the left edge of the terminal screen, and a minimum offset amount from a message prompt block of a preset bubble message to a left side or right side of the terminal screen, computing a distance from the left edge of the message prompt block of the bubble message to the left edge of the anchor object; and based on the distance from the left edge of the message prompt block of the bubble message to the left edge of the anchor object, a width of the anchor object, and the width of the arrow of the message prompt block of the bubble message, computing the distance from the arrow of the message prompt block of the bubble message to the left edge of the message prompt block of the bubble message.

5. The method of claim 3, where computing, based on the computing model, the display position and the text display manner of the bubble message comprises:

based on the distance from the left edge of the message prompt block of the bubble message to the left edge of the anchor object obtained by the first computing model, determining the display position of the bubble message; and based on the distance from the arrow of the message prompt block of the bubble message to the left edge of the message prompt block of the bubble message obtained by the first computing model, determining the text display manner of the bubble message.

6. The method of claim 2, wherein determining, based on the offset amount, the computing model for computing the display position and the display manner of the bubble message comprises:

in response to the offset amount being greater than a second preset threshold, determining the computing model for computing the display position and the display manner of the bubble message as a second computing model.

7. The method of claim 6, wherein performing, based on the second computing model, the following computing:

based on a text width of the bubble message, a width of the terminal screen, a distance from a left edge of the anchor object to the left edge of the terminal screen, and a minimum offset amount from a message prompt block of a preset bubble message to a left side or right side of the terminal screen, computing a distance from the left edge of the message prompt block of the bubble message to the left edge of the anchor object; and based on the distance from the left edge of the message prompt block of the bubble message to the left edge of the anchor object, a width of the anchor object, and the width of the arrow of the message prompt block of the bubble message, computing the distance from the arrow of the message prompt block of the bubble message to the left edge of the message prompt block of the bubble message.

8. The method of claim 6, wherein computing, based on the computing model, the display position and the text display manner of the bubble message comprises:

based on the distance from the left edge of the message prompt block of the bubble message to the left edge of the anchor object obtained by the second computing model, determining the display position of the bubble message; and based on the distance from the arrow of the message prompt block of the bubble message to the left edge of the message prompt block of the bubble message obtained by the second computing model, determining the text display manner of the bubble message.

9. The method of claim 2, wherein determining, based on the offset amount, the computing model for computing the display position and the display manner of the bubble message comprises:

in response to the offset amount being greater than or equal to a first preset threshold, and less than or equal to a second preset threshold, determining the computing model computing the display position and the display manner of the bubble message as a third computing model.

10. The method of claim 9, wherein performing, based on the third computing model, the following computing:

based on a text width of the bubble message and a width of the anchor object, computing a distance from the left edge of the message prompt block of the bubble message to a left edge of the anchor object; and computing that the arrow of the message prompt block of the bubble message is located in a center of a text of the bubble message.

11. The method of claim 9, wherein computing, based on the computing model, the display position and the text display manner of the bubble message comprises:

based on the distance from the left edge of the message prompt block of the bubble message to the left edge of the anchor object obtained by the third computing model, determining the display position of the bubble message; and based on the position of the arrow of the message prompt block of the bubble message obtained by the third computing model, determining the text display manner of the bubble message.

12. An electronic device, comprising:

a memory storing a computer program thereon; and a processor for execution of the computer program in the memory to perform a method of:

executing an instruction configured for identifying an anchor object;

executing an instruction configured for determining, based on position information of the anchor object on a terminal screen, a display position and a display manner of a bubble message corresponding to the anchor object; and in response to an operation on the anchor object, displaying the bubble message at the display position on the terminal screen in the display manner, wherein determining, based on the position information of the anchor object on the terminal screen, the display position and the display manner of the bubble message corresponding to the anchor object comprises:

based on a width of an arrow of a message prompt block of the bubble message, determining the display position of the bubble message; and based on a distance from the arrow of the message prompt block of the bubble message to a left edge of the message prompt block of the bubble message, determining a text display manner of the bubble message.

13. The electronic device of claim 12, wherein executing the instruction configured for determining, based on the position information of the anchor object on the terminal screen, the display position and the text display manner of the bubble message corresponding to the anchor object further comprises:

executing an instruction configured for determining an offset amount of the anchor object from a left edge of the terminal screen;

executing an instruction configured for determining, based on the offset amount, a computing model for computing the display position and the display manner of the bubble message; and executing an instruction configured for computing, based on the computing model, the display manner and the text display manner of the bubble message.

14. The electronic device of claim 13, wherein determining, based on the offset amount, the computing model for computing the display position and the display manner of the bubble message comprising:

in response to the offset amount being less than a first preset threshold, determining the computing model for computing the display position and the display manner of the bubble message as a first computing model.

15. The electronic device of claim 14, wherein performing, based on the first computing model, the following computing:

based on a distance from a left edge of the anchor object to the left edge of the terminal screen, and a minimum offset amount from a message prompt block of a preset bubble message to a left side or right side of the terminal screen, computing a distance from the left edge of the message prompt block of the bubble message to the left edge of the anchor object; and based on the distance from the left edge of the message prompt block of the bubble message to the left edge of the anchor object, a width of the anchor object, and the width of the arrow of the message prompt block of the bubble message, computing the distance from the arrow of the message prompt block of the bubble message to the left edge of the message prompt block of the bubble message.

16. The electronic device of claim 14, where computing, based on the computing model, the display position and the text display manner of the bubble message comprises:

based on the distance from the left edge of the message prompt block of the bubble message to the left edge of the anchor object obtained by the first computing model, determining the display position of the bubble message; and based on the distance from the arrow of the message prompt block of the bubble message to the left edge of the message prompt block of the bubble message obtained by the first computing model, determining the text display manner of the bubble message.

17. The electronic device of claim 13, wherein determining, based on the offset amount, the computing model for computing the display position and the display manner of the bubble message comprises:

in response to the offset amount being greater than a second preset threshold, determining the computing model for computing the display position and the display manner of the bubble message as a second computing model.

18. The electronic device of claim 17, wherein performing, based on the second computing model, the following computing:

based on a text width of the bubble message, a width of the terminal screen, a distance from a left edge of the anchor object to the left edge of the terminal screen, and a minimum offset amount from a message prompt block of a preset bubble message to a left side or right side of the terminal screen, computing a distance from the left edge of the message prompt block of the bubble message to the left edge of the anchor object; and based on the distance from the left edge of the message prompt block of the bubble message to the left edge of the anchor object, a width of the anchor object, and the width of the arrow of the message prompt block of the bubble message, computing the distance from the arrow of the message prompt block of the bubble message to the left edge of the message prompt block of the bubble message.

19. The electronic device of claim 17, wherein computing, based on the computing model, the display position and the text display manner of the bubble message comprises:

based on the distance from the left edge of the message prompt block of the bubble message to the left edge of the anchor object obtained by the second computing model, determining the display position of the bubble message; and based on the distance from the arrow of the message prompt block of the bubble message to the left edge of the message prompt block of the bubble message obtained by the second computing model, determining the text display manner of the bubble message.

20. A computer program product being stored on a non-transitory computer storage medium and comprising a computer program, wherein the computer program, when executed by a processor, implements an information display method of:

executing an instruction configured for identifying an anchor object;

executing an instruction configured for determining, based on position information of the anchor object on a terminal screen, a display position and a display manner of a bubble message corresponding to the anchor object; and in response to an operation on the anchor object, displaying the bubble message at the display position on the terminal screen in the display manner, wherein determining, based on the position information of the anchor object on the terminal screen, the display position and the display manner of the bubble message corresponding to the anchor object comprises:

based on a width of an arrow of a message prompt block of the bubble message, determining the display position of the bubble message; and based on a distance from the arrow of the message prompt block of the bubble message to a left edge of the message prompt block of the bubble message, determining a text display manner of the bubble message.

* * * * *